(12) United States Patent
Hardman, Jr.

(10) Patent No.: US 7,464,403 B2
(45) Date of Patent: Dec. 9, 2008

(54) SECURE MOBILE OFFICE WIRELESS LOCAL-AREA NETWORK APPLICATION INTEGRATION PACKAGE RUNNING FROM CD-ROM

(76) Inventor: Thomas James Hardman, Jr., 13921 Parkland Dr., Rockville, MD (US) 20853

( * ) Notice: Subject to any disclaimer, the term of this patent is extended or adjusted under 35 U.S.C. 154(b) by 1208 days.

(21) Appl. No.: 10/623,631

(22) Filed: Jul. 22, 2003

(65) Prior Publication Data

US 2007/0283339 A1 Dec. 6, 2007

(51) Int. Cl.
*G06F 9/00* (2006.01)
*G06F 15/16* (2006.01)
*G06F 17/00* (2006.01)

(52) U.S. Cl. .............................. 726/14; 713/164; 726/3; 726/11; 726/12

(58) Field of Classification Search .................. 726/11, 726/3, 12, 14; 717/168; 713/164
See application file for complete search history.

(56) References Cited

U.S. PATENT DOCUMENTS

| | | | | |
|---|---|---|---|---|
| 5,974,547 A * | 10/1999 | Klimenko | ........................ | 713/2 |
| 6,279,109 B1 * | 8/2001 | Brundridge | .................... | 713/2 |
| 6,298,443 B1 * | 10/2001 | Colligan et al. | ................ | 726/29 |
| 6,351,810 B2 * | 2/2002 | Gupta | ........................... | 713/2 |
| 6,532,217 B1 * | 3/2003 | Alkhatib et al. | .............. | 370/252 |
| 6,631,468 B1 * | 10/2003 | von Below | ...................... | 713/2 |
| 6,671,243 B2 * | 12/2003 | Ando et al. | ................. | 369/59.1 |
| 6,684,293 B1 * | 1/2004 | Backman et al. | ............. | 711/111 |
| 6,701,450 B1 * | 3/2004 | Gold et al. | ....................... | 714/5 |
| 6,728,711 B2 * | 4/2004 | Richard | ........................... | 707/9 |
| 6,804,774 B1 * | 10/2004 | Larvoire et al. | ................. | 713/2 |
| 6,889,157 B2 * | 5/2005 | Mutchler et al. | ............. | 702/119 |
| 6,944,757 B2 * | 9/2005 | Wilks et al. | ..................... | 713/2 |
| 6,957,276 B1 * | 10/2005 | Bahl | .......................... | 709/245 |
| 6,993,649 B2 * | 1/2006 | Hensley | ......................... | 713/2 |
| 7,085,854 B2 * | 8/2006 | Keane et al. | ................. | 709/250 |
| 7,103,648 B1 * | 9/2006 | Burrows | ..................... | 709/220 |
| 7,143,307 B1 * | 11/2006 | Witte et al. | ..................... | 714/6 |
| 7,152,156 B1 * | 12/2006 | Babbitt et al. | .................. | 713/2 |
| 7,181,738 B2 * | 2/2007 | Chan | ........................... | 717/175 |
| 7,254,625 B2 * | 8/2007 | Gluska et al. | ................ | 709/222 |
| 7,272,723 B1 * | 9/2007 | Abbott et al. | ................ | 713/185 |
| 7,356,679 B1 * | 4/2008 | Le et al. | ......................... | 713/1 |
| 2001/0033517 A1 * | 10/2001 | Ando et al. | .................. | 365/200 |
| 2001/0056425 A1 * | 12/2001 | Richard | ........................ | 707/10 |
| 2002/0056008 A1 * | 5/2002 | Keane et al. | ................. | 709/245 |
| 2002/0194394 A1 * | 12/2002 | Chan | ........................... | 709/319 |
| 2003/0026186 A1 * | 2/2003 | Ando et al. | .............. | 369/53.24 |
| 2003/0074550 A1 * | 4/2003 | Wilks et al. | ..................... | 713/2 |
| 2003/0097553 A1 * | 5/2003 | Frye, Jr. | ......................... | 713/2 |
| 2003/0182074 A1 * | 9/2003 | Mutchler et al. | ............. | 702/119 |
| 2004/0044707 A1 * | 3/2004 | Richard | ........................ | 707/204 |
| 2004/0117610 A1 * | 6/2004 | Hensley | ......................... | 713/2 |
| 2005/0037787 A1 * | 2/2005 | Bachner et al. | .............. | 455/502 |
| 2006/0041613 A1 * | 2/2006 | Fackelmayer et al. | ........ | 709/203 |
| 2006/0047791 A1 * | 3/2006 | Bahl | .......................... | 709/220 |
| 2006/0080522 A1 * | 4/2006 | Button et al. | ................... | 713/2 |
| 2007/0038887 A1 * | 2/2007 | Witte et al. | ..................... | 714/6 |
| 2007/0061563 A1 * | 3/2007 | Babbitt et al. | .................. | 713/2 |
| 2008/0016178 A1 * | 1/2008 | Portugali | ..................... | 709/217 |
| 2008/0215796 A1 * | 9/2008 | Lam et al. | .................... | 711/100 |

OTHER PUBLICATIONS

Klaus Knopper, Building a self-contained auto-configuring Linux system on an iso9660 filesystem, Oct. 2000, USENIX.*

* cited by examiner

*Primary Examiner*—David García Cervetti

(57) ABSTRACT

This Invention permits very rapid installation of operating systems onto off-the-shelf hardware. Furthermore, this Invention addresses multiple configuration issues pertaining to the creation of unique "InterNet Hosts", and thus enables the very rapid installation of operating systems preconfigured to boot into a "ready to internetwork" mode with no subsequent configuration needs. It integrates several different existing security and encryption models which are considered robust. Further, the media on which this Invention will be distributed, and from which it will be run, are read-only CD-ROM, providing further defense against InterNet-based attacks.

A variety of scripts generates a series of CD-ROMs which will each boot an Intel-ix86-based PC to an individual network identity, all of which will have the characteristics listed above, and will automatically network if provided with the IEEE 802.11b standard wireless PC Cards.

1 Claim, No Drawings

SECURE MOBILE OFFICE WIRELESS LOCAL-AREA NETWORK APPLICATION INTEGRATION PACKAGE RUNNING FROM CD-ROM

BACKGROUND OF THE INVENTION

The Invention is in the field of InterNetworked Computer Systems. It is designed to provide enhanced security in general, and specifically to provide for rapid deployment of Secure Mobile Offices with fill InterNet server and laptop-workstation capabilities, operating in and supporting a Secure Wireless Local-Area Network ("LAN") as well as supporting general InterNet operations and Virtual Local-Area Network ("VLAN") operations.

BACKGROUND OF PROBLEM

Security is increasingly a concern on the global InterNet. A wide variety of attacks have been launched against many online sites, including invasions of networked computers which are responsible for monitoring and control of critical economic and physical infrastructure, including computers which control elements of the electrical power distribution system, and computers which control dams. Fears of terrorist exploitation of such weak systems are reasonable fears, and a variety of methods have been proposed to increase the security of these networked machines.

Also, rapid data communications between members of organizations, and between organizations, is increasingly vital, and in no case is it more vital than in a situation of emergency response. These communications must be secure, as a variety of bad outcomes may emerge if communications can be intercepted, with or without modification and retransmission.

Situations will probably occur which will require rapid deployment of non-military response teams to sites of chemical, biological, or radiological attacks, or similarly catastrophic events. Possession of secure data networking technology may be essential to responders to such events. Disruptions in supply lines, procurement systems, or the disruptive nature of emergency situations might make it difficult to get the necessary computing resources into the field, and lack of standardization may further complicate matters, particularly if there are incompatibilities between operating systems. There is a clear need for a standardized Secure Mobile Office Network Application Package. Furthermore, such Secure Mobile Offices must be lightweight, consume little power, be extremely portable at a moment's notice, and should be networked mostly wirelessly as an aid to rapid deployment and ease of relocation and reconfiguration in the field. Further, such Secure Mobile Offices must enable logins to remote computers, in the case where insufficient local capacity exists to perform specific operations better done from the headquarters. Such logins to remote computers must be exceptionally secure so as to not enable attackers to imitate such logins and gain access to the headquarters computer.

Secure Mobile Offices might, if deployed into a precipitated catastrophe such as the recent destruction of the World Trade Center on 2001 Sep. 11, come under direct attack through their networking systems. Thus, their network "hardening" is of high importance. Further, multiple layers of hardening should be applied, so that if any one layer is penetrated another will be encountered.

In networked systems, one of the more feared attacks is one where the attacker penetrates and assumes enough control to alter the contents of non-volatile storage, for example, replacing password files on a harddrive. Such a "root compromise" can turn a computer into the cybernetic equivalent of a ticking time bomb, and in fact the computer may be usurped and turned into a launching point for a variety of attacks against other networked machines. At the very least, all security may be disabled without the knowledge of the legitimate user, turning their machine into an attacker's window into the inner workings of the organization's methods and techniques. Ordinarily networked computers are part of a large and complex system which has a variety of means to trace the source of such attacks, such as "dial-up pen-registers"; however, wireless mobile networks have no such reliable log-and-trace mechanism, and could very easily come under attacks through their wireless connections and should be highly hardened against potential penetration to, and alteration of, their non-volatile storage systems. The present commercially-available wireless encryption systems, which are the first line of defense against such attacks, are known to be very weak and easily compromised.

DETAILED DESCRIPTION OF THE INVENTION

Our invention is a Secure Mobile Office Applications Integration Package which runs entirely from CD-ROM on computers which do not have the capability to write to the CD-ROM. This package integrates two separate layers of encryption and authentication suitable to both wireless and hard-wired TCP/IP (IPv4 and IPv6) networked data communications. This Package is intended to be used in "ensemble operations" where there are at least two computers running with the Package: one of which serves as a Kerberos authentication server, as well as a firewall and firewall-traversal proxy (SOCKS5) which both permits authorized wireless networked computers to access the global InterNet, and which disallows unauthorized networked computers on either side of it to access the other side of the firewall; and, one or more "client" machines, laptops equipped with wireless communications cards.

We chose the Linux operating system as it is very robust, and used the Slackware version 7 distribution with a version 2.4.17 kernel rebuilt to incorporate the "FreeSWAN" IPSEC IP-security system for authentication and encryption. Alternatives such as the MicroSoft Windows (™) operating system were rejected as being too expensive and vulnerable to attack. We also rejected approaches using any variant of "SSH" or "OpenSSH" ("secure shell") for our host-to-host remote login application; instead we used the MIT "Kerberos" system for authentication and encryption of remote logins and remote application activation. We used the "PCMCIA-CS" software which enables the Linux kernel to operate PCMCIA ("PC Card") devices, including the popular Hermes "Prism-I" chipset IEEE 802.11b-standard wireless communication cards. We wrote scripts to allow operation entirely from CD.

Operation

When the kernel is booted and starts the "init" process which controls startup and runlevel, it calls several scripts. Our special script;
- initializes portions of random-access internal memory into "ramdisks", and creates filesystems there. These are the only read-write elements of this operating system
- copies, from the CD, into ramdisk, those directories and files from the Linux system which must be read-write for the operating system to function
- creates, in ramdisk, a "swap space", or virtual memory area, to permit operations exceeding the non-reserved random-access memory of the computer loads into memory and executes such kernel modules, code libraries or applications as are necessary for standard operation initializes and starts the wireless communications card (and if so equipped, an ethernet PCMCIA network interface card)

establishes wireless communications with its wireless-access point and its SOCKS5 firewall traversing proxy, and negotiates and authenticates to establish IPSEC triple-DES-encrypted TCP/IP data communications (client machines); or, alternatively, establishes IPSEC communications with authorized hosts such as headquarters computers, and starts to proxy between the wireless mobile network and the hardwired global InterNet (firewall mode), and also starts up the Kerberos authentication server.

establishes virtual private networks between headquarters and the proxy servers, including NFS (UNIX network file-system) mounts of remote mass-storage, between client machines, and any IPSEC-capable computers which must be accessed.

excludes all TCP/IP communications with devices not specifically authorized to participate in this Secure Mobile Office Wireless Local-Area Network, other than those communications required to carry the virtual-private-network encrypted TCP/IP packets.

DETAILED DESCRIPTION OF THE INVENTION

This system is based on "Slackware Linux 7.1", Linux kernel version 2.4.17, and "FreeS/WAN-1.95", and MIT Kerberos 5-1.2.2., and "PCMCIA-CS-3.1.31". All are freely available from the InterNet. The system also makes use of the SOCKS5 Advanced Programming Interface ("API") specification and a variety of vendors sell products which make use of this API to act as "proxies".

To create the basis of the system, install the full distribution (with the exception of "X-Windows and X-Windows applications) of Slackware Linux 7.1 in the recommended manner on a secondary harddrive on an Intel-x86 platform machine running any recent version of Linux, and boot to the new Linux installation. Unpack the FreeS/WAN package in the recommended manner. Unpack, build, and install MIT Kerberos 5 binaries and libraries in the recommended manner. Install your SOCKS5 proxy in the recommended manner.

Unpack and configure the linux-2.4.17 kernel package. Configure to build for the intended hardware platform, with maximum modularity to assure that a kernel is built which is small enough to be capable of stand-alone boot from a 1.44 megabyte floppy. Configure to build to include all standard networking features such as TCP/IP, and PPP. Configure to support "RAMDISK", with 8 ramdisks of 16384 Kbytes in size. Many other kernel configuration options exist but are not generally relevant to this particular Specification. Complete configuration and build and install the kernel and kernel modules. Reboot to the new kernel to test operability. If the kernel works, build and install the FreeS/WAN IPSEC package which will rebuild the kernel and install the rebuilt kernel. Reboot to the new kernel to test the kernel, and make a "boot floppy" from this new IPSEC-capable kernel, Unpack, configure, build and install the "PCMCIA-CS" package in a manner appropriate to the intended destination machine and relevant kernel configuration options.

Shutdown in an orderly fashion and reboot to the primary harddrive. Mount the secondary hardrive to the primary filesystem in some convenient place. For example we will specify the directory "/mnt/proto".

Modify initialization scripts in the directory /mnt/proto/etc/rc.d. These scripts will run at boot time to create filesystems in ramdisk and load those filesystems with the appropriate files as bootstrap progresses. This completes the basic creation and configuration.

At this point, one could create an "ISO-9660 image" and burn it to CDROM, and one could use the "boot floppy" to boot the CDROM in any Intel-x86 platform PC with 128 megabytes of RAM, but multiple copies of such a CDROM would be duplicates of each other and would interfere with each other if operated simultaneously on the same non-world-routable subnets, or on the world-routable InterNet.

In production for clients, we will copy the entire contents of /mnt/proto to another directory, for example "/mnt/installer". A variety of scripts will take care of such tasks as generating a series of IP addresses, hostnames, Kerberos keytabs and configuration files, IPSEC configuration files, SOCKS5 configuration files, etc., as necessary to provide each individual CDROM with a unique network identity, "personalization", and encryption key. As each instance of the package in /mnt/installer is provided with a unique identity and encryption keys, it will then be converted to "ISO-9660 image" and burned to CDROM. The final result will be a number of CDROMs, each of which will boot with a unique network address and network identity, and with all other "individualization configuration" issues resolved.

Once a series of these CDROMs has been generated, they can be inserted into any laptops or workstations based on the Intel-ix86 platform which are equipped with 128 megabytes of RAM and a CDROM drive, and IEEE-802.11b Wireless-LAN PCMCIA cards which are supported by the "PCMCIA-CS" software package. When the boostrap procedure is finished, if an IEEE-802.11b "Wireless Access Point" is available, these laptops will be full-featured "InterNet Hosts" in a network exchanging data with at least one layer of triple-DES encryption at all times, ready for users to log in and begin their work.

What I claim as my invention is:

1. A computer-readable medium storing computer-executable instructions that when executed by a processor cause a computer to perform a method for creating a preconfigured network, the method comprising:

creating a plurality of nodes on bootable read-only media of a TCP/IP ("transmission control protocol/internet protocol") network capable of encrypted communications as follows:

installing an operating system to a target partition of a computer hard drive mass storage device residing in a computer;

compiling an operating system kernel supporting IPSec ("Internet Protocol Security") and a plurality of virtual disks;

copying the compiled operating system kernel to the target partition;

compiling an authentication server and copying associated files to the target partition;

restarting the computer to boot from the target partition;

initializing the authentication server which will control authentication and authorization functions for the network;

creating instances within the authentication server of specific IP addresses and hostnames;

generating, in a specific directory, multiple unique instances of authentication and authorization information for the authentication server;

configuring parameters for IPSec;

configuring start-up parameters for the operating system;

configuring the authentication server;

configuring the operating system loader;

rebooting to an original instance of the operating system to begin per-node generation of bootable read-only media images to be written to storage media;

moving the authentication and authorization information for the authentication server from the target partition to a local directory;

copying the target partition to a processing partition;

iteratively generating unique bootable read-only media image information, including internet protocol ("IP") address, hostname information, and routing information for the plurality of nodes, from the processing partition;

copying the previously-generated host-specific authentication and authorization information which must conform to the newly generated internet protocol ("IP") address from the local directory into the processing partition; and writing the generated unique bootable read-only media image information to read-only media;

wherein each bootable image on read-only media, when used as the boot image for a computer, boots the computer into the operating system such that each such computer will have a unique preconfigured IP address.

* * * * *